United States Patent [19]

Hollingsworth et al.

[11] 3,791,810

[45] Feb. 12, 1974

[54] PROCESS FOR PREPARING LIGHTWEIGHT FERTILIZER CONTAINING AMMONIUM POLYPHOSPHATE

[75] Inventors: Clinton Allen Hollingsworth, Lakeland; Louis John Lamb, Lutz, both of Fla.

[73] Assignee: Borden, Inc., New York, N.Y.

[22] Filed: Aug. 30, 1972

[21] Appl. No.: 284,770

Related U.S. Application Data

[63] Continuation of Ser. No. 83,234, Oct. 22, 1970, abandoned.

[52] U.S. Cl. .................................... 71/34, 71/47
[51] Int. Cl. ................................................ C05b 7/00
[58] Field of Search ...................... 71/34, 47, 64 E

[56] References Cited
UNITED STATES PATENTS

| | | | |
|---|---|---|---|
| 3,459,531 | 8/1969 | Chapin et al. | 71/62 |
| 3,399,986 | 9/1968 | Wiegmen | 71/47 |
| 3,382,059 | 5/1968 | Getsinger | 71/34 |
| 2,912,318 | 11/1959 | Kieweg | 71/47 |

FOREIGN PATENTS OR APPLICATIONS

| | | | |
|---|---|---|---|
| 897,067 | 5/1962 | Great Britain | 71/28 |

Primary Examiner—Samih N. Zaharna
Assistant Examiner—Richard Barres
Attorney, Agent, or Firm—George P. Maskas; Donavon L. Faure

[57] ABSTRACT

A process for preparing a lightweight fertilizer containing ammonium polyphosphate and optionally other plant nutrients by heating a mixture of ammonium polyphosphate with a leavening and hardening agent selected from calcium carbonate, calcium oxide, magnesium carbonate, sodium carbonate, sodium bicarbonate, dolomite or manganese carbonate at a temperature of about 250°F to 375°F for a time sufficient to foam the mixture and subsequently cooling the foamed mixture. Preferably, various plant nutrients such as sources for potash are added to the mixture prior to foaming.

1 Claim, No Drawings

PROCESS FOR PREPARING LIGHTWEIGHT FERTILIZER CONTAINING AMMONIUM POLYPHOSPHATE

This is a continuation, division, of application Ser. No. 82,234 filed Oct. 22, 1970 and now abandoned.

BACKGROUND OF THE INVENTION

The use of ammonium polyphosphate as a plant fertilizer is a well accepted horticultural procedure. For example, U.S. Pat. No. 3,542,579 suggests such a use. However, while ammonium polyphosphate possesses the highly desirable attributes of ease and simplicity of manufacture with high nutrient value, the physical properties of this substance seriously limit its application. Thus for example, ammonium polyphosphate is quite hygroscopic and sticky and the fertilizer containing this substance has a tendency to cake even on short periods of storage. Consequently it cannot be readily applied to the desired surface. Furthermore, because of the tendency of the granules of ammonium polyphosphate to stick together, on application, uneven fertilization is obtained and often times results in "burning" of the plant. "Burning" in this context refers to the dessication of plant tissues associated with high treatment levels of conventional nitrogen-containing fertilizers in which the nitrogen is made rapidly available to the plant. The instant invention overcomes the above mentioned disadvantages.

U.S. Pat. No. 3,399,986 of Sept. 3, 1968 to Wiegman discloses a process for preparing a high non-ortho $P_2O_5$ content in ammonium polyphosphate by adding the same leavening agents as used in this invention to finely ground mono- or diammonium phosphate and then heating the mixture to a temperature of at least 210°C. Advantages of the instant process over that of the U.S. Pat. No. 3,399,986 patent include: addition of various ingredients to the polyphosphate itself, preferably while it is in a molten state; less loss of valuable fertilizer ingredients, e.g. nitrogen in the final product; the efficiency of preparing the foamed material after the synthesis of ammonium polyphosphate while said polyphosphate is in a molten state.

SUMMARY OF THE INVENTION

The present invention relates to a process of preparing a foamed lightweight fertilizer containing, ammonium polyphosphate and optionally other plant food. the fertilizer of this invention is characterized by an extremely low bulk density and a high analysis of assimilable plant nutrient materials.

DETAILED DESCRIPTION OF THE INVENTION

It has now been found that the very desirable fertilizing properties of ammonium polyphosphate can be remarkably enhanced by practicing the embodiments of this invention. A fertilizer is accordingly provided in which the nitrogen component may be more efficiently used by the plant and thereby avoid "burning" the plant.

The process for the preparation of the desired lightweight ammonium polyphosphate is a simple and convenient procedure which is commercially suitable involving melting or admixing with a melt of ammonium polyphosphate, a hardening and leavening agent, optionally with additional nitrogenous containing material, a potassium salt, causing the mixture of ammonium polyphosphate melt and added ingredients to foam, then cooling and optionally grinding the resultant product.

Typically, ammonium polyphosphate of commerce can be melted or obtained as a melt on manufacture at a temperature ranging from about 250°F to about 375°F. The various ingredients are conveniently added to the molten polyphosphate and mixed therewith as one of the added nutrient ingredients. Potassium nitrate is the potassium salt used but other potassium salts can also be employed such as potassium carbonate, potassium sulfate, potassium chloride, potassium phosphate and the like. Also, while in the molten state, other plant nutrient materials such as various inorganic nitrates, ammoniacal nitrates or other organic nitrogen containing compounds e.g., urea, can also be added, accompanied by agitation. To provide additional slow release nitrogen, various slowly soluble compounds or resins such as urea formaldehyde resins can be added, e.g. see Examples 2–5 herein. Such additional nutrients can be added in quantities of about 5 to 45 percent based on the weight of the polyphosphate and preferably from about 10 to 30 percent.

In a preferred embodiment of the invention, the hardening and leavening agent, optionally with other plant nutrients, is added to an ammonium polyphosphate melt at a temperature of about 250°F to 275°F together with agitation to obtain a fairly uniform mixture. The molten mixture is then heated above 275°F but below or not higher than about 375°F to accelerate foaming. The foamed melt is then cooled.

The hardening and leavening agents used in this invention are selected from the following compounds or mixtures thereof; calcium carbonate; calcium oxide; magnesium carbonate; sodium bicarbonate; sodium carbonate; dolomite and manganese carbonate. These leavening agents can be used in quantities of about 5 to 35 percent, based on the weight of the ammonium polyphosphate, and preferably from about 10 to 30 percent thereof.

The time required for mixing or foaming is not critical. Thus, a time sufficient for foaming can vary from about 1 minute to 20 minutes or more, preferably, and particularly when temperatures above 275°F are used, the time varies from about 1 minute to about 5 minutes.

The addition of the hardening and leavening agent, e.g. calcium carbonate, increases the hardness and friability of the product and minimizes hygroscopicity while at the same time reducing the density due to the production of a foamed or porous structure.

When the desired degree of foaming is obtained from the melt, it is cooled to room temperature. The cooled melt occurs in the form of a mass which is then turn milled or ground into discrete particles preferably of about 10 mesh (Tyler) size.

The fertilizer composition obtained in accordance with the present invention is not only substantially free from caking and dust but also characterized by a very low bulk density of from about 20 to 40 lbs. per cubic foot. On the other hand, it has high analysis of nitrogen and phosphorous.

In use, the fertilizer of this invention is spread directly on an area e.g. a lawn. Because the nitrogen content is more uniformly and controllably released, the phenomenon of "burning", generally associated with the application of fertilizer containing ammonium polyphosphate is entirely eliminated.

Consequently, the fertilizer of this invention possesses significant improved properties over other fertilizers of this class known in the art. Furthermore, because the nitrogen is released at a rate which the plant can assimilate, there is virtually no waste at all of the fertilizer.

As it will be obvious to those skilled in the art, other biological active materials in biologically active amounts such as insecticides, nematocides, animal repellants, insect repellants, herbicides, fungicides, and the like, can also be included into the low bulk density ammonium polyphosphate fertilizer of this invention to further enhance its spectrum of activity.

In order to further illustrate the practice of this invention the following Examples are included.

EXAMPLE 1

Into a steel kettle provided with an agitator, is charged 45 pounds of ammonium polyphosphate and 45 pounds of potassium nitrate. The temperature of the charge is adjusted to 250°F and 10 pounds of limestone are added to the charge. The mixture is then agitated while increasing the temperature over a 20 minute period until a temperature of 300°F is obtained. The mixture is thus foamed by the escape of gases. After the 20 minute heating period the mixture is allowed to solidify into a porous mass. The mass is reduced to approximately 10 mesh (Tyler) size.

The product thus obtained has the following analysis:

| | |
|---|---|
| N | = 10.4 |
| $P_2O_5$ | = 26.2 |
| $K_2O$ | = 21.8 |
| lbs./cu. ft. | = 33.4 |

EXAMPLES 2–6

The following Examples 2–6 were performed by first heating ammonium polyphosphate at about 250°F to 275°F to form a melt. The various other ingredients, except those containing carbonates, were added to the melt at 250°F to 275°F. Finally the carbonate containing material was added and the temperature raised to about 300°F over a period of about 1 to 5 minutes with vigorous agitation. The melt was then permitted to cool.

| Raw Materials (Percent) | EXAMPLES | | | | |
|---|---|---|---|---|---|
| | 2 | 3 | 4 | 5 | 6 |
| Ammonium Polyphosphate | 26.1 | 23.1 | 20.8 | 21.2 | 90 |
| $KNO_3$ | 15.0 | 15.0 | 16.2 | — | — |
| Limestone | 5.0 | 6.5 | 7.5 | 3.8 | 10 |
| Ammonium Nitrate | 32.4 | 33.4 | 34.5 | 41.4 | — |
| DuPont Ureaform | 21.5 | 21.0 | 21.0 | 28.9 | — |
| Zinc Carbonate | — | 1.0 | — | — | — |
| KOH | — | — | — | 4.7 | — |
| Total | 100.0 | 100.0 | 100.0 | 100.0 | 100.0 |
| Product Analysis (Percent) | | | | | |
| N | 23.4 | 24.0 | 27.4 | 27.4 | 8.6 |
| $P_2O_5$ | 16.2 | 13.8 | 11.6 | 12.3 | 52.0 |
| $K_2O$ | 6.0 | 4.9 | 6.6 | 4.0 | — |
| Lbs./cu. ft. | 28.7 | 27.0 | 26.8 | 24.3 | 29.0 |
| Temp., °F at Finish of Foaming | 300. | 300. | 300. | 300. | 300. |

EXAMPLE 7

Following the procedure of Example 1, other leavening agents such as calcium oxide, sodium carbonate, sodium bicarbonate, magnesium carbonate and manganese carbonate are used in place of limestone in the process and composition of Example 1.

We claim:

1. A process for production of low bulk density fertilizer which comprises:
   a. forming a mixture of ammonium polyphosphate and from about 5 to 35 percent based on the weight of said polyphosphate of a hardening and leavening member selected from the group consisting of calcium carbonate, sodium carbonate, sodium bicarbonate, dolomite and maganese carbonate, then
   b. foaming the mixture by admixing the ammonium polyphosphate at a temperature of about 250° to 275°F and then heating the mixture to a higher temperature intermediate 275° to 375°F for a time of about one minute to above five minutes;
   c. cooling the mixture; and
   d. reducing the particle size of the cooled mixture.

* * * * *